US012316049B2

(12) United States Patent
Strangfeld et al.

(10) Patent No.: US 12,316,049 B2
(45) Date of Patent: May 27, 2025

(54) PLUGGABLE DEVICE COMBINATION FOR PROTECTING AGAINST SURGES

(71) Applicant: DEHN SE, Neumarkt i.d.OPf. (DE)

(72) Inventors: Uwe Strangfeld, Neumarkt (DE); Stefan Schön, Neumarkt (DE); Georg Wittmann, Neumarkt (DE); Richard Daum, Neumarkt (DE)

(73) Assignee: DEHN SE, Neumarkt i.d.OPf. (DE)

( * ) Notice: Subject to any disclaimer, the term of this patent is extended or adjusted under 35 U.S.C. 154(b) by 366 days.

(21) Appl. No.: 17/635,077

(22) PCT Filed: Jul. 30, 2020

(86) PCT No.: PCT/EP2020/071469
§ 371 (c)(1),
(2) Date: Feb. 14, 2022

(87) PCT Pub. No.: WO2021/037473
PCT Pub. Date: Mar. 4, 2021

(65) Prior Publication Data

US 2022/0294157 A1 Sep. 15, 2022

(30) Foreign Application Priority Data

Aug. 29, 2019 (DE) ..................... 20 2019 104 742.9
Mar. 12, 2020 (DE) ..................... 20 2020 101 378.5

(51) Int. Cl.
*H01R 13/00* (2006.01)
*H01R 13/422* (2006.01)
(Continued)

(52) U.S. Cl.
CPC ..... *H01R 13/6271* (2013.01); *H01R 13/4226* (2013.01); *H01R 13/6666* (2013.01)

(58) Field of Classification Search
CPC ............ H01R 13/6271; H01R 13/4226; H01R 13/6666
See application file for complete search history.

(56) References Cited

U.S. PATENT DOCUMENTS 5,574,612 A * 11/1996 Pak ........................ H02B 1/056
361/636
2014/0313632 A1* 10/2014 Hirschmann .......... H02H 3/085
361/131
(Continued)

FOREIGN PATENT DOCUMENTS

DE 36 39 533 A1 6/1988
DE 295 19 313 U1 1/1996
(Continued)

OTHER PUBLICATIONS

DE 102006033274 A1; published on Jan. 31, 2008 (Year: 2008).*
(Continued)

*Primary Examiner* — Pete T Lee
(74) *Attorney, Agent, or Firm* — Bodner & Bodner, PLLC; Christian P. Bodner; Gerald T. Bodner

(57) ABSTRACT

The invention relates to a pluggable device combination for protecting against surges, having a socket-like bottom part of U-shaped cross section for receiving at least one plug module which accommodates a surge protection element, latching means which act between the plug module and the socket-like bottom part being provided, said latching means comprising first means which are formed on a biased joint on opposite sides of the plug module and respectively interact in a latching manner with associated second means on the bottom part, the latching connection being breakable by pressing the joint at the faces of the plug module, and the respective joint transitioning into an actuation area, the actuation areas additionally being formed opposite each other on the plug module in such a way that imaginary
(Continued)

Figure 1:
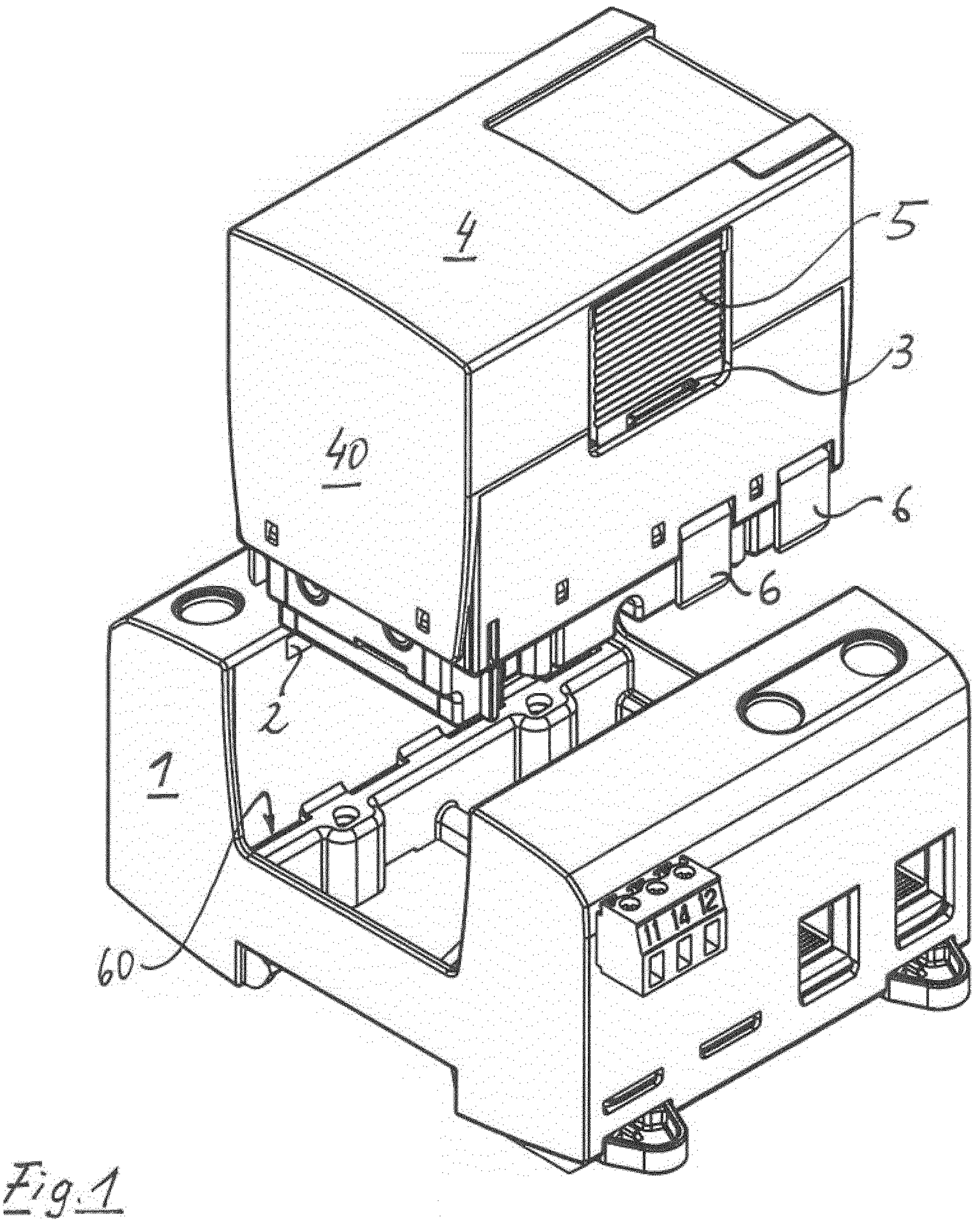

connecting lines between the actuation areas would form the shape of an at least approximate triangle.

10 Claims, 4 Drawing Sheets

(51) Int. Cl.
*H01R 13/627* (2006.01)
*H01R 13/66* (2006.01)

(56) References Cited

U.S. PATENT DOCUMENTS

| | | | | |
|---|---|---|---|---|
| 2016/0380378 | A1* | 12/2016 | Makwinski | H02G 3/12 439/131 |
| 2018/0374666 | A1* | 12/2018 | Zhai | H01C 7/12 |
| 2021/0066894 | A1* | 3/2021 | Strangfeld | H01T 4/04 |
| 2021/0280995 | A1* | 9/2021 | Daum | H01T 4/04 |

FOREIGN PATENT DOCUMENTS

| | | | | | |
|---|---|---|---|---|---|
| DE | 100 01 667 | C1 | | 10/2001 | |
| DE | 20 2004 006 227 | U1 | | 9/2004 | |
| DE | 10 2005 005 914 | A1 | | 8/2006 | |
| DE | 20 2006 021 210 | U1 | | 9/2013 | |
| JP | 2002229607 | A | | 8/2002 | G05B 19/048 |
| JP | 2008527729 | A | | 7/2008 | H01C 7/12 |
| JP | 2012-84321 | A | | 4/2012 | |
| JP | 2012084321 | A | * | 4/2012 | |
| WO | 95/12905 | A1 | | 5/1995 | |

OTHER PUBLICATIONS

JP 2012084321A English Translation (Year: 2012).*
DE 102006033274 A1 (Year: 2008).*
International Search Report corresponding to International Patent Application No. PCT/EP2020/071469, mailed Oct. 30, 2020 (German and English language document) (5 pages).
Notice of Reasons for Refusal (in Japanese) and an English translation thereof, dated Mar. 29, 2024, issued by the Japanese Patent Office for Applicant's related Japanese Patent Application No. 2022-512364.

* cited by examiner

PLUGGABLE DEVICE COMBINATION FOR PROTECTING AGAINST SURGES

PRIORITY CLAIM

This application is a 35 U.S.C. § 371 National Stage Application of PCT/EP2020/071469, filed on Jul. 30, 2020, which claims the benefit of priority to Serial Nos. 20 2019 104 742.9, filed on Aug. 29, 2019, and 20 2020 101 378.5, filed on Mar. 12, 2020 in Germany, the disclosures of which are incorporated herein by reference in their entirety.

The invention is based on a pluggable device combination for protecting against surges, having a socket-like bottom part of U-shaped cross section for receiving at least one plug module which accommodates at least one surge protection element, latching means which act between the plug module and the socket-like bottom part being provided, said latching means comprising first means which are formed on a biased joint on opposite sides of the plug module and respectively interact in a latching manner with associated second means on the bottom part, the latching connection being breakable by pressing the joint at the end faces of the plug module, and the respective joint transitioning into an actuation area, according to claim 1, and a plug module having at least one surge protection element, according to claim 10.

Prior-art surge protection devices are predominantly designed as plug-in device combinations, comprising a bottom part and a plug module.

In the bottom part, connection terminals for contacting the respective electrical conductors are arranged and corresponding receptacles for the plug module which is to be inserted are present. Further, the bottom part receives elements which enclose one or more plug-in contacts of the plug module, in such a way that the desired mechanical and electrical contact and the corresponding hold of the plug module in the bottom part is provided.

The actual surge protection elements are located in the plug module, for example spark gaps, varistors, gas discharge tubes or the like or combinations of said means.

In many cases, the bottom parts are designed as U-shaped bodies, the open limbs of the U-shaped body laterally enclosing the plug module or modules. The plug module then rests on the connecting limb of the U-shaped part.

Further, the bottom part has receiving elements on its assembly side, which enable for example top-hat rail mounting.

The advantage of the explained division of functions between the bottom part and the plug module is that in the event of revision or maintenance work the plug module can be removed without having to open the connection terminals or disconnect the corresponding system from the power supply.

The removed plug module can then be examined outside the electrical system with the aid of test devices and, if necessary, exchanged and reinserted.

As regards the state of the art, reference is made in this regard to DE 36 39 533 C2, DE 295 19 313 U1, DE 100 01 667 CI and DE 20 2004 006 227 U1.

A problem with the design of the plug-in contact arrangement between the bottom part and the plug module is that it has to be constructed for the surge current of the waveform 10/350 ps and 8/20 ps, or mains-frequency short-circuit currents, flowing through it in the event of leakage.

In surge arresters such as are required commercially, considerable surge currents of up to 100 kA have to be routed over the corresponding contacts repeatedly, with virtually no burning and wear.

Depending on the contact force between the contact elements, the plug modules can be removed without tools or can only be removed with the aid of a tool. If no additional measures are provided, there is a risk that the plug module will undesirably jump out of the bottom part under the influence of electrodynamic forces during a surge current process. As a result, proper overall functionality of the device is not readily provided and is not provided in the long term.

WO 95/12905 shows a solution which also comprises a U-shaped bottom part for receiving at least one plug module which accommodates a surge protection element and in which latching means are provided which act between the plug module and the socket-like bottom part.

On opposite sides of the plug module, latching lugs formed on a hinge joint are present, each of which engages in an associated latching recess on the plug module, the latching connection being breakable by pressing the hinge joint at the end faces of the plug module.

The hinge joint of the above-described solution is located on the bottom part of the plug module, and the pressure surface is a small amount above the latching lugs on the end faces of the module.

In order to be able to apply a pressure force to the latching lugs or pressure areas, it is necessary to provide recesses in the region of the U-shaped bottom part. The pressure areas of the known prior art are relatively small and are difficult to grip because of the necessary recesses or depressions in the bottom part. Because of the arrangement of the actual hinge on the lower face of the plug module, a very large pressure path is also required to break the latching. Further, the latching surface of the latching lug on the plug module and the trough in the bottom part run parallel, in such a way that in the event of a shock or vibration there is the possibility of an undesired release of the locking.

Further, the development of a pluggable device combination having hinge joints according to DE 20 2006 021 210 U1 is known. Therein, each hinge joint is located in the transition region between the top and the associated end face of the plug module, the hinge joint transitioning into an actuation area directed towards the socket-like bottom part. This makes handling easier when plugging in or unplugging the module.

Proceeding from the above, the object of the invention is to specify an improved plug-in device combination for protection against surges on the basis of a socket-like U-shaped bottom part for receiving at least one plug module which accommodates a surge protection element, easy and safe plugging and unplugging of the module into and from the bottom part being possible even if a large number of plug-in contacts are electrically necessary.

The object of the invention is achieved by the combination of features according to either claim 1 or claim 10, the dependent claims setting out configurations and developments which are at least expedient.

Accordingly, the starting point is a plug-in device combination for protection against surges, having a socket-like bottom part of U-shaped cross-section for receiving at least one and preferably a plurality of plug modules which accommodate surge protection elements, latching means which are known per se being provided between the plug module or the socket-like bottom part.

These latching means comprise first means which are formed on opposite sides of the plug module on a biased joint and which respectively interact in a latching manner with associated second means on or in the bottom part. The latching connection can be broken by pressing the joint at the sides of the plug module. The joint also transitions into an associated actuation area.

According to the invention, the actuation areas are formed opposite one another on the plug module in such a way that imaginary connecting lines between the actuation areas would form the shape of a triangle.

This may be either a scalene or an isosceles triangle.

In a preferred embodiment of the invention, a single actuation area is arranged on one side of the plug module. The opposite side of the plug module preferably has two spaced-apart actuation areas.

In this regard, the positions and the respective dimensions of the actuation areas are designed for a three-finger gripping process.

With the formation of three actuation areas approximately in the region of the corner points of the aforementioned triangle, the plug module can be gripped intuitively, preferably with the thumb, index finger and middle finger. Because of the three-finger actuation, large plug-in forces due to a large number of plug-in contacts can also be overcome, without requiring an expenditure of force which feels much greater.

In a development, the plug module according to the invention has a large number of surge protection elements and combines them within a housing. Further, the plug module has a large number of tongue-like plug-in contacts on the underside, which are designed to engage in mating contacts in the socket-like bottom part.

In a development of the invention, a hook-shaped latching lug, of which the latching surface is at a defined angle to the actuation area, is formed at the lower end of each actuation area.

The U-limbs of the bottom part each have a hook-shaped, undercut latching recess which is complementary to the latching lug.

In a preferred embodiment of the invention, the surface of the actuation area is structured. Here, in turn, the structuring has a preferred longitudinal structuring having an orientation transverse to the plugging-in or unplugging process.

The ends of the plug module on the underside are provided with conical end face portions so as to converge towards one another.

In this regard, the insides of the limbs of the U-shaped, socket-like bottom part have a shape which is complementary to the conical end face portions.

The hinge joint may have a weakening portion which improves ease of actuation and which can be implemented for example as a groove on the inside of the joint.

The respective actuation areas are largely freely accessible, even when the plug module is plugged in and latched, and can therefore be actuated safely.

According to the invention, a plug module is further provided with at least one, preferably a plurality of surge protection elements and latching means, arranged in a housing, on opposite plug module sides and with actuation areas for these, the actuation areas being formed opposite one another on the plug module in such a way that imaginary connecting lines formed between the actuation areas would form the shape of a triangle, making a three-finger gripping process intuitive.

The invention is to be explained in greater detail in the following with reference to drawings and an exemplary embodiment.

Figure 2:
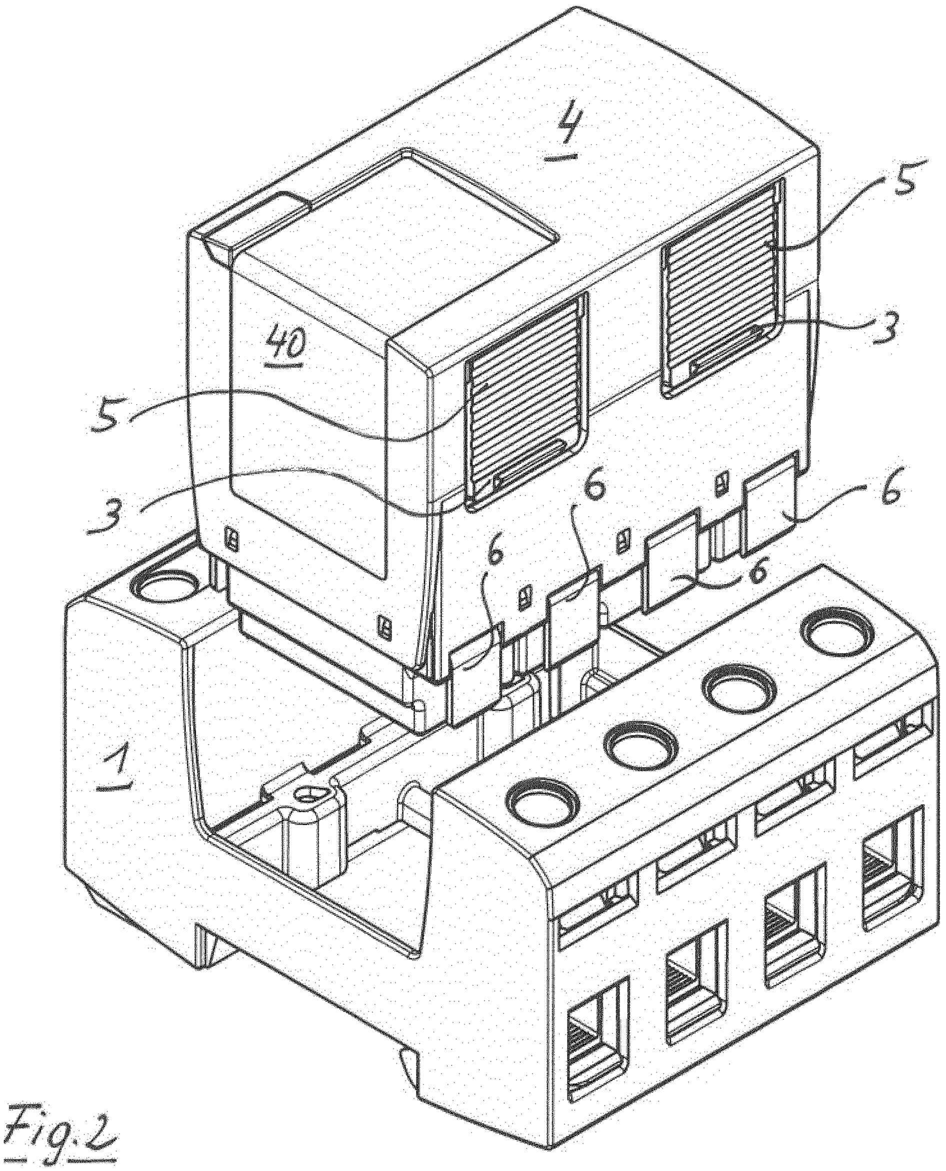
Figure 3A:
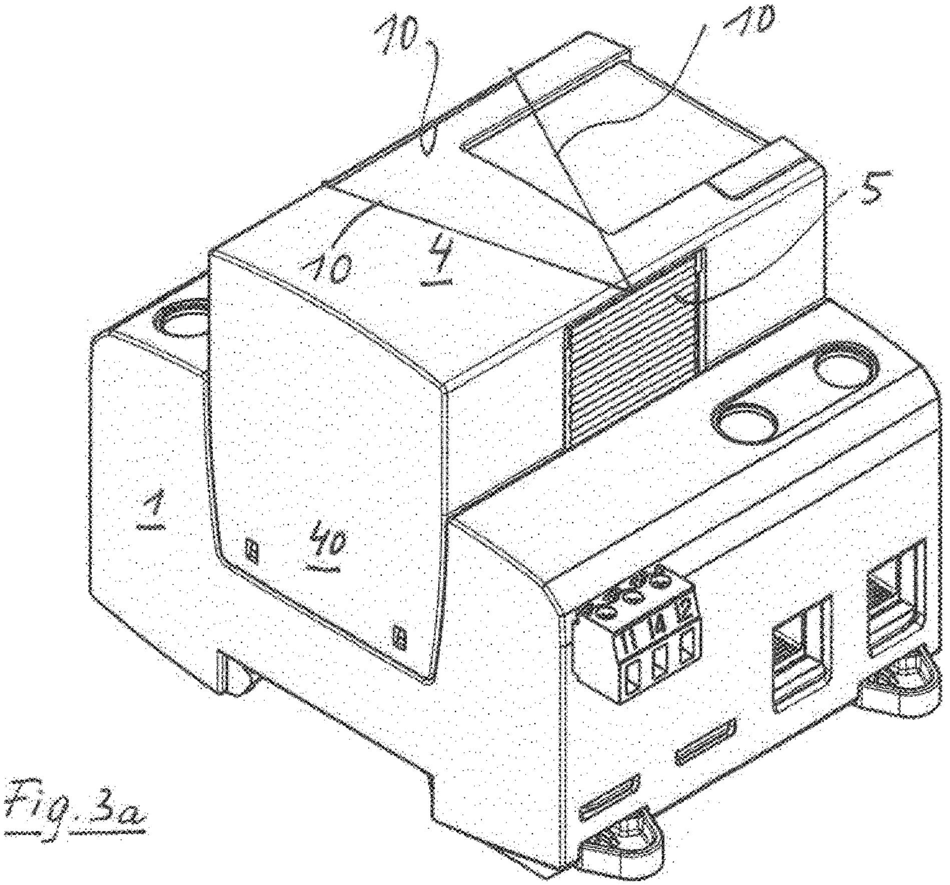
Figure 3B:
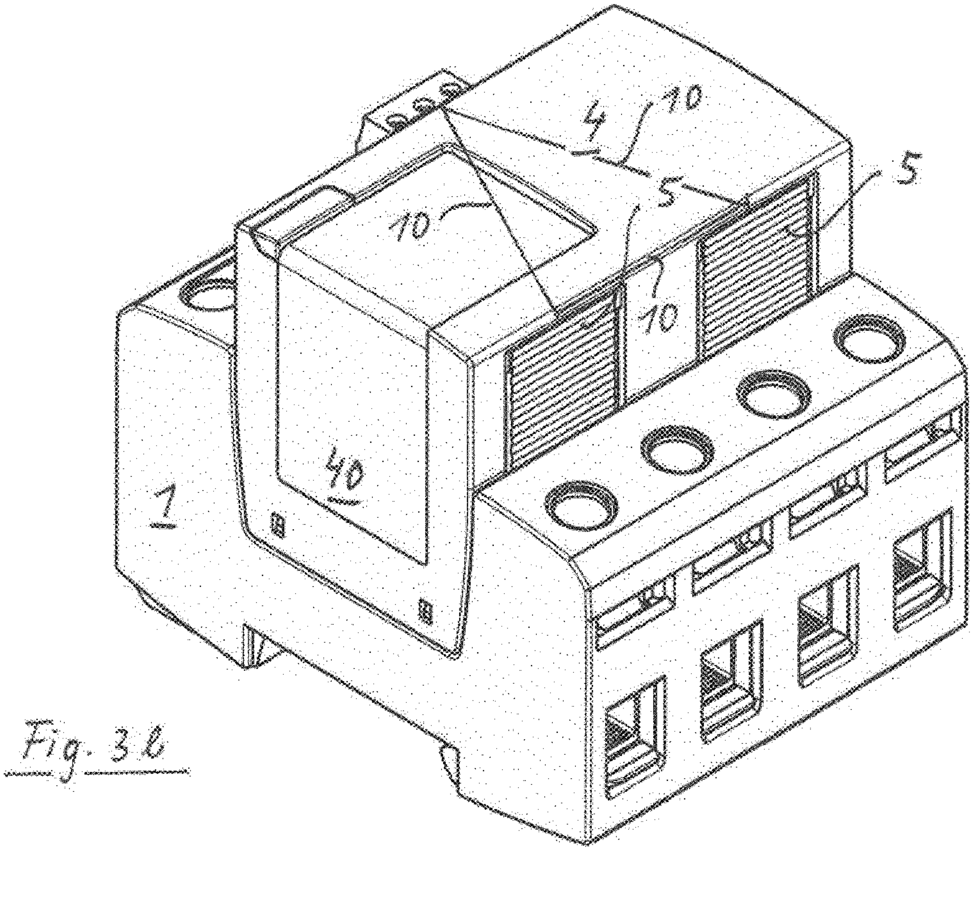
Figure 4:
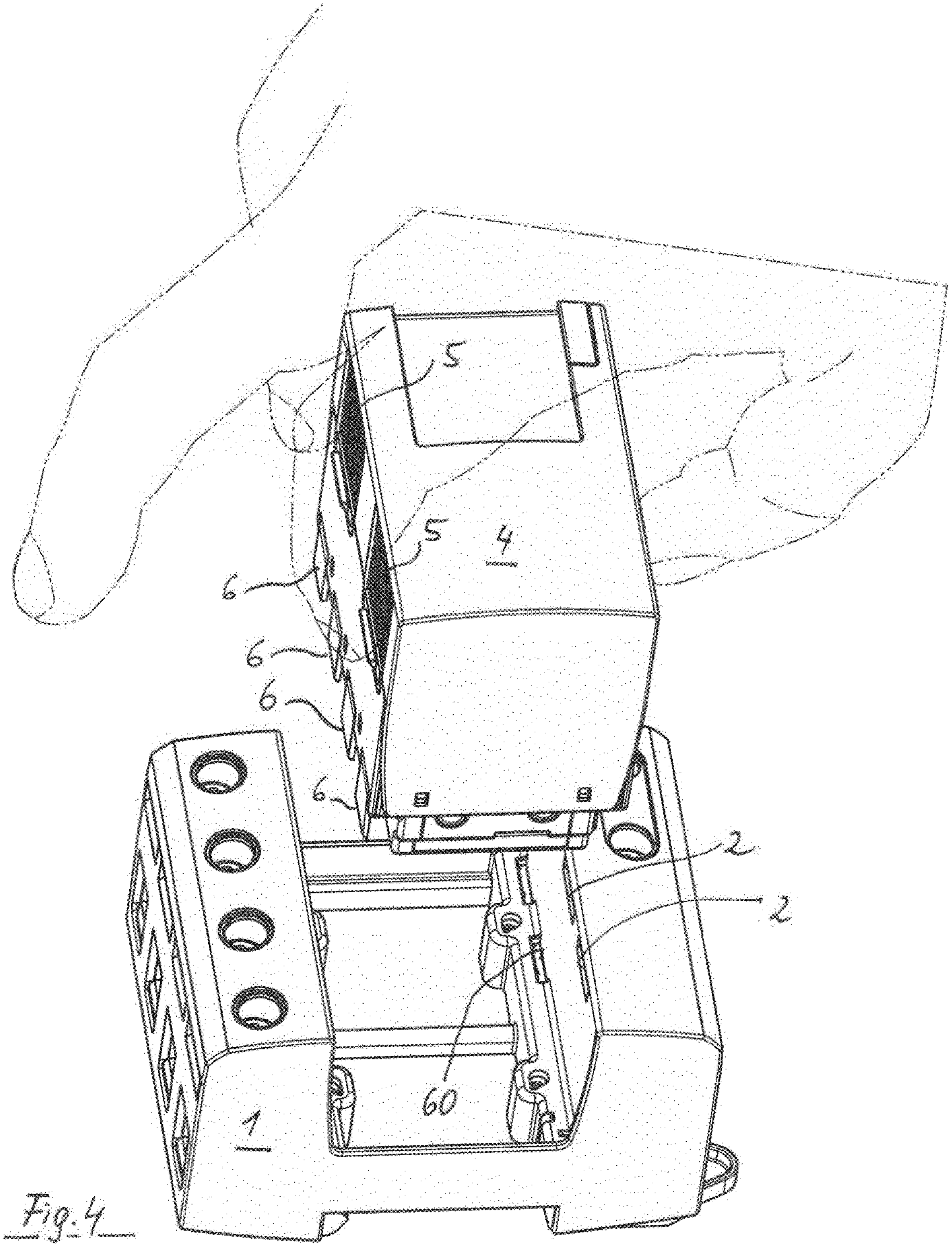

In the drawings:

FIG. 1 and FIG. 2 are different perspective views of an example U-shaped socket-like bottom part together with a plug module, FIG. 1 showing an actuation area on the plug module formed approximately in the middle of a side face, and FIG. 2 showing two actuation areas formed on the opposite side of the plug module, with visible means which make it possible for the plug module to be latched to the socket-like bottom part;

FIG. 3*a* is a drawing of the complete pluggable device combination with a plug module accommodated in the socket-like bottom part, with a view of the side of the plug module which has an actuation area;

FIG. 3*b* is a drawing similar to that of FIG. 3*a*, but with a view of the side of the plug module with two spaced-apart actuation areas, the indicated lines symbolizing imaginary connecting lines between the actuation areas which form the shape of a triangle, so as to make it clear where and how the actuation areas are to be implemented on the end faces of the plug module, and FIG. 4 is a drawing of the process of plugging in or unplugging the plug module with the indicated three-finger gripping process, using the thumb on one actuation area and preferably the index finger and middle or ring finger on the opposite actuation areas.

The device combination is based on a socket-like bottom part 1 of U-shaped cross section.

On the limbs of the socket-like bottom part 1, undercut latching recesses 2 are formed, which are complementary to hook-shaped latching lugs 3 on the associated plug module 4.

The hook-shaped latching lugs 3 are each located at the lower end of an associated actuation area 5.

The surface of the actuation areas 5 has longitudinal structuring in order to ensure a secure grip.

Exerting pressure on the corresponding actuation areas 5 causes the hook-shaped latching lugs 3 to move into a position emerging from the latching recesses 2. The plug module 4 can then be removed from the socket-like bottom part 1 by pulling.

To ensure the necessary rigidity of the actuation areas 5 and to ensure that no plug-in part is unintentionally released in the event of shocks or vibrations, balcony-like projections are provided in the upper third of the actuation areas, so as to brace the rear face thereof, in the interior of the associated plug module 4. These projections push the actuation areas slightly outwards and prevent undesired movement inwards, in other words towards the centre of the plug module 4, when no process of releasing or unplugging the plug module 4 by appropriate exertion of pressure and actuation of the surfaces 5 is desired. These effective bracing stops also ensure that the latching lugs 3 engage securely and correctly in the latching recesses 2 of the bottom part 1.

The relevant plug module 4 accommodates a plurality of surge protection elements and combines them in a single housing. In accordance with the electrical functions, a large number of tongue-like plug contacts 6 are provided on the plug module underside, the tongue-like plug contacts interacting with and dipping into mating contacts 60 in the socket-like bottom part 1.

It can also be seen from the drawings that the underside ends of the respective plug module 4 have conical end face portions 40 which converge towards one another.

The insides of the limbs of the U-shaped socket-like bottom part 1 have a shape which is complementary to the conical end face portions 40.

It can be seen from FIGS. 3*a* and 3*b* that the actuation areas 5 are freely accessible even when the plug module 4 is plugged in and latched.

The actuation areas 5 are formed opposite one another on the plug module 4 in such a way that imaginary connecting lines 10 (see FIGS. 3*a* and 3*b*) formed between the actuation areas would form the shape of an at least approximate triangle.

According to FIG. 3*b*, two laterally spaced-apart actuation areas 5, to which a single actuation area 5 (see FIG. 3*a*) is assigned on the opposite plug module side, are provided on one side of the plug module 4.

The positions and the respective dimensions of the actuation areas 5 are designed for a three-finger gripping process and implemented accordingly.

The intuitive gripping process, preferably using the thumb, index finger and middle or ring finger, is also shown symbolically by FIG. 4.

The invention claimed is:

1. A pluggable device combination for protecting against surges, having a socket-like bottom part of U-shaped cross section for receiving at least one plug module which accommodates a surge protection element, latching means which act between the plug module and the socket-like bottom part being provided, said latching means comprising first means which are formed on a biased joint on opposite sides of the plug module and respectively interact in a latching manner with associated second means on the bottom part, the latching connection being breakable by pressing the joint at the faces of the plug module, and each joint merging into a respective actuation area, wherein on one side of the plug module at least two spaced-apart actuation areas are provided and reside on respective separate at least first and second joints, and on the opposite side of the plug module a single actuation area is provided and which resides on a separate third joint, and the actuation areas are formed opposite each other on the plug module in such a way that imaginary connecting lines between the actuation areas and their respective first, second and third joints would form the shape of an at least approximate triangle.

2. The pluggable device combination according to claim 1, wherein the plug module combines a large number of surge protection elements, and a large number of tongue-like plug-in contacts are formed on the plug module underside and are designed to engage in mating contacts in the socket-like bottom part.

3. The pluggable device combination according to claim 1, wherein the positions and the respective dimensions of the actuation areas are designed for a multi-finger, in particular three-finger gripping process.

4. The pluggable device combination according to claim 1, wherein a hook-shaped latching lug, of which the latching surface is at a defined angle to the actuation area, is formed at the lower end of each actuation area, and the U-limbs of the bottom part each have a hook-shaped, undercut latching recess which is complementary to the latching lug.

5. The pluggable device combination according to claim 1, wherein the surface of the actuation area has structuring, preferably longitudinal structuring.

6. The pluggable device combination according to claim 1, wherein the underside ends of the plug module have conical end face portions which converge towards one another.

7. The pluggable device combination according to claim 6, wherein the inside of the limbs of the U-shaped socket-like bottom part have a shape which is complementary to the conical end face portions.

8. The pluggable device combination according to claim 1, wherein each hinge joint of the actuation area has a weakening portion which improves ease of actuation and which can be implemented as a groove on the inside of each joint.

9. The pluggable device combination according to claim 1, wherein the respective actuation areas are freely accessible, even when the plug module is plugged in and latched.

10. A plug module having at least one surge protection element and latching means comprising first means which are formed on a biased joint on opposite plug module sides as well as actuation areas for these, and each joint merging into a respective actuation area, wherein on one side of the plug module at least two spaced-apart actuation areas are provided and reside on respective separate at least first and second joints, and on the opposite side of the plug module a single actuation area is provided and which resides on a separate third joint, and the actuation areas are formed opposite one another on the plug module in such a way that imaginary connecting lines drawn between the actuation areas and their respective first, second and third joints would form the shape of an at least approximate triangle.

* * * * *